Oct. 22, 1940.  J. T. MILLS ET AL  2,219,136
SAW WITH INTERCHANGEABLE BLADE
Filed April 6, 1939
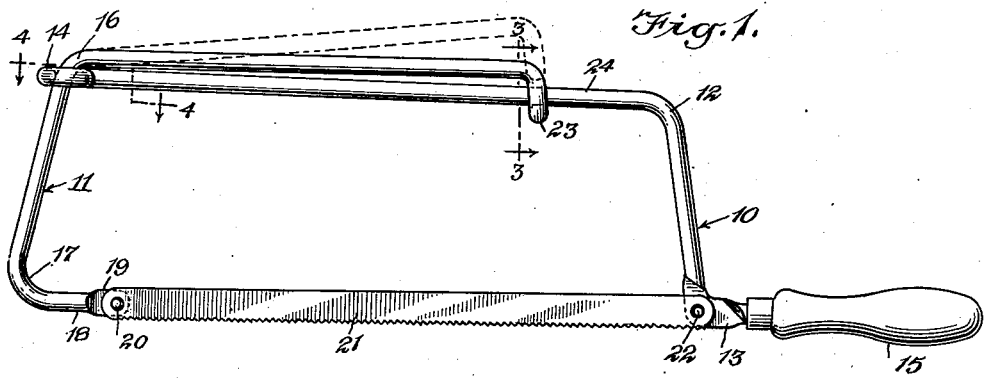
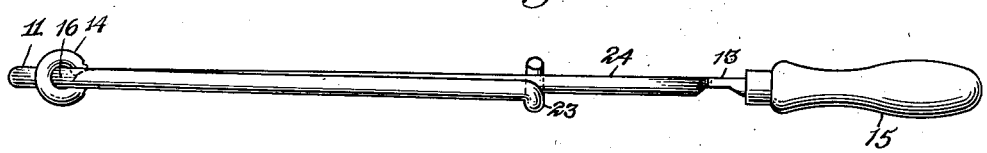
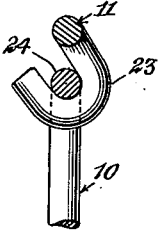  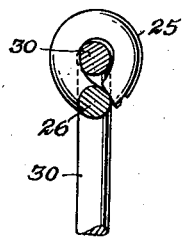
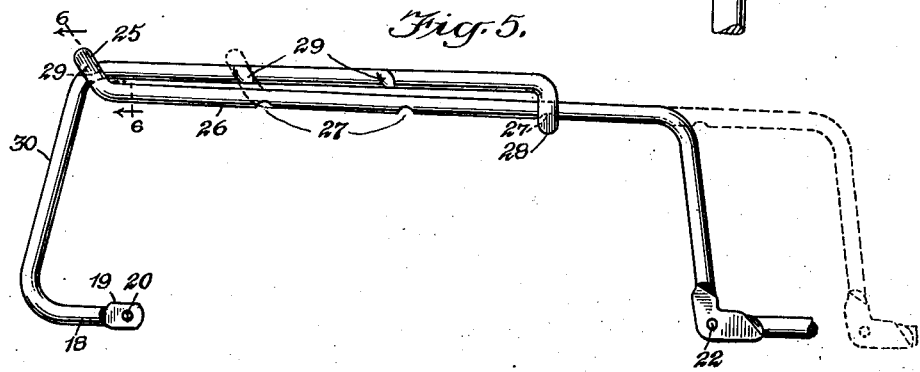
WITNESSES
INVENTORS
John Thornton Mills
and John Francis Parson
BY
ATTORNEYS Patented Oct. 22, 1940

2,219,136

UNITED STATES PATENT OFFICE 2,219,136

SAW WITH INTERCHANGEABLE BLADE

John Thornton Mills, Essex, and John Francis Parson, Westbrook, Conn., assignors to John Thornton & Co., Inc., Westbrook, Conn., a corporation of Delaware Application April 6, 1939, Serial No. 266,290

1 Claim. (Cl. 145—34)

This invention relates to saws, and more particularly to saws having a removable blade such as hack saws, jig saws, meat saws, and various types of woodworking saws.

In the operation of saws of this type considerable tension is placed upon the frame and it is essential for the efficient operation that the saw blade be held under considerable tension in order to prevent it from buckling and dragging. In the ordinary saw frame the tension is set and often becomes loose. Moreover, great difficulty is experienced in fastening the blade proper to the frame, especially where a spring tension is used.

An object of this invention is to provide a saw frame whereby the blade may be quickly and easily attached thereto and whereby sufficient tension is provided so that the blade may always be kept under tension.

A further object is to provide a frame of the character described which is simple and economical in construction, easier to handle and light in weight. In using a hack saw the workman normally holds the saw by the handle with his right hand and uses his left hand to guide the opposite edge of the blade. In our invention we have provided a grip whereby the front of the blade may be guided by the thumb.

A further object of the invention is to provide a saw frame of the type described, in which blades of various length may be used and which is adjustable to various lengths.

In the accompanying drawing—

Fig. 1 is a side view of a saw frame embodying our invention;

Fig. 2 is a plan view thereof;

Fig. 3 is a cross-sectional view taken on the line 3—3 of Fig. 1;

Fig. 4 is a cross-sectional view taken on the line 4—4 of Fig. 1;

Fig. 5 is a modified form adapted for extension;

Fig. 6 is a cross-sectional view taken on the line 6—6 of Fig. 5.

Our improved saw frame consists of two members 10 and 11. The member 10 is made of spring steel and is bent at angles 12 and 13, and is provided with an eye or loop 14 at one end and with a handle 15 at the opposite end. The member 11 is bent upon itself at 16 and is situated in the loop or eye 14. At its lower end the member 11 is bent upon itself at 17 to form an inwardly extending arm 18.

The end 19 of the arm 18 is provided with a pin 20 adapted to engage a hole in the saw blade 21. A similar pin 22 is situated at the angle 13. The opposite end of the member 11 is bent upon itself to form a U-shaped catch 23 which is adapted to engage the section 24 of the member 10.

It will be seen that by disengaging the catch 23 from the section 24, the member 11 may be pivoted in the loop 14. The saw blade 21 will then be fastened to the pins 20 and 22 and the catch 23 engage with the member 24 under pressure. This stretches the blade 21 taut and keeps it under tension.

The angle 17 forms a convenient hold for the thumb and in handling the saw the thumb may be extended around this angle so that the member 11 rests between the thumb and index finger. When the operator decides to change the saw blade he merely disengages the catch 23 and attaches a new blade.

In the modified form shown in Figs. 5 and 6, the eye 25 is set at an angle with relation to the member 26. The member 26 is provided with a plurality of notches 27 which are adapted to register with the catch 28 and to prevent its movement along the member 26. Corresponding notches 29 are made in the member 30, and the notches 29 are adapted to engage the inside of the loop or eye 25. It will be seen that the frame may be extended, as shown in the dotted lines.

The loop 25 will engage the notches 29 on the member 30 while the catch 28 will engage the notches on the member 26, thus preventing the collapse of the extended frame. The angle at which the eye 25 is placed with relation to the member 26 tends to grip the member 30 firmly in the eye, and in order to vary the posititon the catch 28 must be disengaged from the member 26 and raised upwardly to slide the member 30 through the eye 25. It will be seen that the frame may thus be extended to accommodate saw blades of various predetermined lengths.

We claim:

In combination with a saw blade having apertures at either end, an adjustable saw frame comprising two members each made of resilient round material, one of said members being bent at one end at substantially right angles to form a handle and in the opposite direction to form a back member, means adjacent the handle for engaging the saw blade, said means comprising a flattened portion of said member at said angle and a pin adapted to engage the aperture at one end of said saw blade, a loop at the opposite end of said member made by bending said member upon itself, a second member adapted to rest in said loop and being bent substantially at right angles adjacent one end to form a finger hold, means for engaging the opposite end of the saw blade comprising a flattened portion at the end of said member and a pin in said flattened portion to engage the aperture in said saw blade, a further bend in said second member adjacent said loop, and a hook on the other end of said second member adapted to resiliently engage the back portion of said first member.

JOHN THORNTON MILLS.
JOHN FRANCIS PARSON.